United States Patent [19]

Kuhara

[11] Patent Number: 4,887,667
[45] Date of Patent: Dec. 19, 1989

[54] DEVICE FOR PROVIDING COMMUNICATION BETWEEN WATER TANKS OF HEAT ACCUMULATION TANK SYSTEM

[76] Inventor: Takashi Kuhara, 20-16, Kamiyama-cho, Shibuya-ku, Tokyo 150, Japan

[21] Appl. No.: 208,416
[22] PCT Filed: Sep. 30, 1987
[86] PCT No.: PCT/JP87/00715
§ 371 Date: Jun. 1, 1988
§ 102(e) Date: Jun. 1, 1988
[87] PCT Pub. No.: WO88/02455
PCT Pub. Date: Apr. 7, 1988

[30] Foreign Application Priority Data

Oct. 1, 1986 [JP] Japan ............................ 61-233735
Sep. 1, 1987 [JP] Japan ............................ 62-218865

[51] Int. Cl.[4] .................. F24D 11/00; F04F 10/00
[52] U.S. Cl. .................. 165/96; 165/104.19; 137/133; 137/136; 137/142; 137/572; 126/437
[58] Field of Search .............. 165/104.19, 96; 137/572, 574, 142, 136, 133; 126/437

[56] References Cited

U.S. PATENT DOCUMENTS 4,607,687  8/1986  Ohara et al. .................. 165/104.19

FOREIGN PATENT DOCUMENTS 32-10288  12/1957  Japan .
54-28963  3/1979  Japan .
55-21200  2/1980  Japan .
55-20354  5/1980  Japan .
58-53563  3/1983  Japan .

Primary Examiner—Albert W. Davis, Jr.
Attorney, Agent, or Firm—Fleit, Jacobson, Cohn, Price, Holman & Stern

[57] ABSTRACT

Disclosed is a heat accumulation tank system intended for use as a heat source of, for example, an air conditioner and which is installed, for example, in a building or under a green zone, a stadium or a parking area. The heat accumulation tank system is composed of a pularity of water tanks which are connected through a communication passage such as a communication pipe. The pressure in the communication passage is controlled by means of a pressurizing device or a vacuum device, so that the state of communication is controlled such as to establish or interrupt the communication between the water tanks or to control the rate of flow of water between these water tanks.

37 Claims, 12 Drawing Sheets

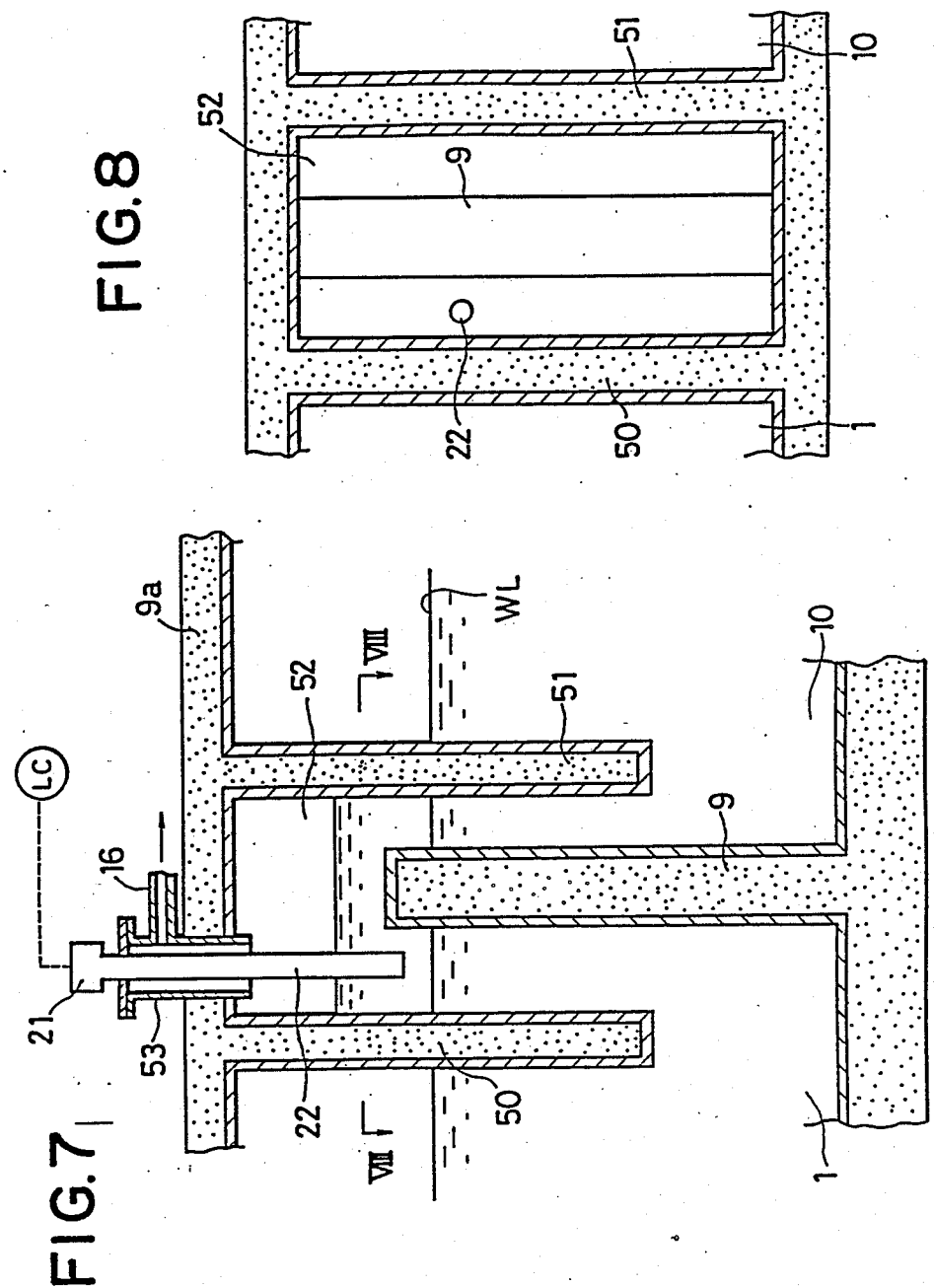

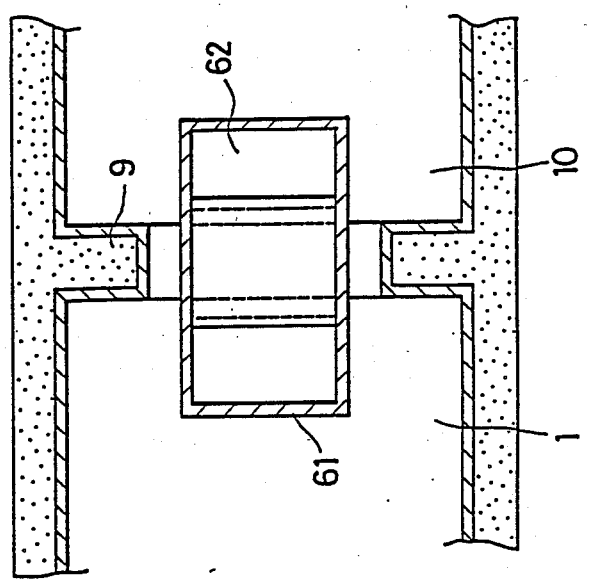
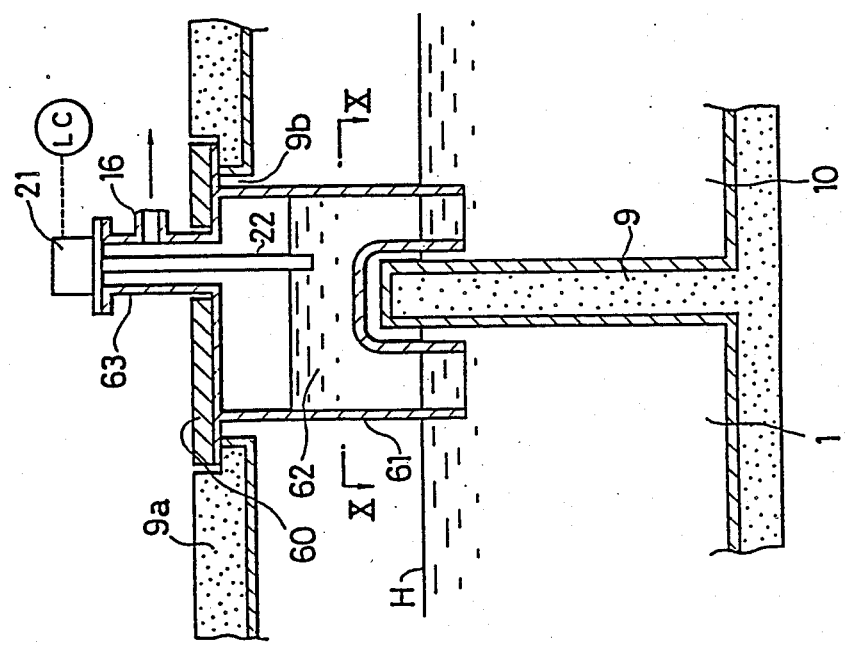

DEVICE FOR PROVIDING COMMUNICATION BETWEEN WATER TANKS OF HEAT ACCUMULATION TANK SYSTEM

DESCRIPTION

1. Field of the Invention

The present invention relates to a device for providing communication between a pair of adjacent water tanks in a heat accumulating water tank system. More particularly, the present invention is concerned with a device for providing communication between a pair of water which are adjacent to each other in a heat accumulation water tank system which is installed in a building or under a green zone, a stadium or a parking area and which is sectioned into a plurality of water tanks by means of partition walls.

2. Background Art

The current tendency for better living conditions has given a rise to the demand for air conditioning, as well as for hot water running service and running service of cooling water for cooling machines. In particular, buildings designed for business activities consume much energy because of cooling load which is increased as a result of heat generation from various machines such as computers and other office machines. In order to reduce the level of peaks of thermal load and electrical power consumption, while attaining a higher economy by utilization of electrical power available at midnight, buildings intended for business use and other large-scale buildings are equipped with heat accumulating water pools or tanks. In some cases, area-wide air-conditioning systems are adopted for conditioning air in a wide area including a plurality of buildings, by employing a water pool or tank system.

Usually, a heat accumulation water tank, i.e., heat accumulation tank, is sectioned into a plurality of water tanks by means of partition walls, for the purpose of improving the heat accumulation effect through smoothing the circulation of water in the tank system and for the purpose of attaining a higher strength of the tank. In order to efficiently conduct air conditioning by making use of water in the heat accumulation tank system, it is necessary that the amount of water to be heated or cooled is suitably controlled in accordance with the seasonal variation in the demand for air conditioning. To cope with such a demand, the water tanks of a heat accumulating tank system are grouped into a plurality of blocks each including one or more water which are mutually connected, the adjacent blocks being communicated with each other through communication passages which can be opened and closed as desired. In operation, the communication passages are selectively opened and closed so that these blocks of water tanks are selectively put into practical use in such a manner that only a single block is used or a plurality of blocks are used in combination, thereby optimizing the amount of water to be heated or cooled for the purpose of air conditioning.

It is also to be pointed out that the heat accumulating tank system has to be periodically drained for the purpose of inspection of the interior and replacement of water. Preferably, this is conducted by draining some of the blocks while other blocks are operating under ordinary operating conditions, so that the successive blocks of tanks are sequentially drained and inspected. The communication passages between the blocks have to be opened and closed also for this purpose.

Conventionally, the means for seelectively opening and closing the communication passage employs a mechanical valves such as a slide-type shut-off valve or a butterfly valve. These valves are usually operated by a valve actuator which is installed on the upper side of the tank so as to be moved up and down or rotated thereby opening and closing the communication passage.

The valve mechanism used conventionally thus requires a large space for accommodating a valve actuating mechanism which is installed on an upper part of the tank. In addition, maintenance work has to be executed frequently for maintaining good conditions of the valve and the valve actuating mechanism. For instance, in the case of a slide-type valve, it is necessary to lift the valve member to open the communication passage, so that a space large enough to accommodate the valve member has to be preserved on the upper side of the heat accumulating tank. On the other hand, when a butterfly valve is used, thè have shaft has to be extended upward to project from the tank and a valve operating handle has to be attached to the extended portion of the valve shaft. Obviously, the thermal load on the air conditioner is increased as the scale of the building is increased, and the heat accumulating tank also becomes greater. This requires the size of the of the valve in the communication passage and, hence, of the mechanism for actuating the valve, with the result that a large space is required for the maintenance work. In consequence, the area for lent on the floor immediately above the heat accumulating tank or the area of the machine room or parking area is reduced uneconomically.

The conventional valve mechanisms suffer a problem in regard to the durability. Namely, the temperature of the water in the heat accumulating tank is usually maintained at about 5° to 10° C. during cooling of air and at about 50° to 60° C. during heating. The valve member, valve seat and seal members of the valve mechanism are left in water for a long period of time, so that the problems are caused such as deterioration of the valve member and the sealing member, rusting of movable parts, stick of the sealing member, and leak through the valve. In consequence, works such as renewal of the sealing members and maintenance of the sliding parts of the valve have to be conducted rather frequently. These works are laborious and require much time and money. In some cases, water pooled in the tank system has to be wasted.

DISCLOSURE OF THE INVENTION

Accordingly, a primary object of the present invention is to overcome the above-described problems concerning the communication passages in the heat accumulation tank system.

Thus, a practical object of the present invention is to provide a device for providing communication between water tanks in a heat accumulating water tank system which is capable of selectively opening and closing communication passage between water tanks while requiring only a small installation space, and which exhibits superior durability due to elimination of any movable part.

In order to meet these demands, the present invention proposes to selectively open and close the communication between two water tanks of a heat accumulation tank system, by suitably controlling the pressure in the communication passage.

According to one form of the invention, there is provided a device for providing communication between two adjacent water tanks in a heat accumulating tank system having a plurality of water tanks which are separated by partition walls, comprising a control chamber connected to one of two adjacent water tanks, the control chamber being closed at least upper side thereof, and a rising passage opens into the control chamber. The rising passage has one end which opens into the other of two adjacent water tanks while the other ends rises in the control chamber so as to level in the water tank. A vacuum suction means is connected to the upper space in the control chamber through a valve means.

In another form of the present invention, an inverse U-shaped passage is connected between two adjacent water tanks such that one end thereof is opened into one of two adjacent water tanks while the other end opens into the other of two water tanks, and the pressure in the upper portion of the inverse U-shaped passage is controlled by means of pressure control means.

In still another form of the present invention, a control tank is disposed in one of two adjacent water tanks, and the control tank accommodates a rising pipe having one end opened to the exterior of the control tank at a level below the normal water level in the one of two adjacent tanks and the other end rising in the control tank so as to open at the upper end in an upper portion of the control chamber Furthermore, the control chamber is connected to the other of the two adjacent water tanks, and a pressure control means is provided for controlling the pressure in the upper portion of the control chamber.

In a modification of this form of the invention, the interior of the control chamber disposed in one of the two water tanks is divided by partitioning means into a first chamber and a second chamber which communicate with each other at their upper portions, the first chamber communicating with one of the two water tanks while the second chamber communicates with the other of two water tanks.

In still another form of the present invention, passage forming means provides an inverse U-shaped communication passage which is disposed to bridge over the partition wall separating two adjacent water tanks so as to provide a communication between these water tanks across the partition wall. The space in the upper portion of the U-shaped passage is connected to a vacuum suction means through a valve means.

In any one of these forms of the invention, the pressure control means or the vacuum suction means may be substituted by a pressurizing/sucking means which is capable of effecting pressurizing of communication passage for providing the communication and sucking for the purpose of breaking the communication.

In the communication control device of the invention, the end of the control chamber opening into the control chamber is disposed such that the end of the passage opening in the control chamber is positioned at a level above the normal water level in the water tank. Therefore, the communication between two adjacent water tanks is interrupted when vacuum is not introduced into the upper portion of the control chamber As vacuum is introduced into upper portion of the control chamber, the water level in the control chamber rises and, when the water level has reached to a feel above the open end of the passage in the control chamber, two water tanks are brought into communication with each other through the control chamber In the second form of the present invention, when the mid portion of the inverse U-shaped passage is positioned above the normal water level in the water tank, air stagnates in the mid portion of the inverse U-shaped passage so that the communication between two water tanks is interrupted. However, when the vacuum is applied to the mid portion of the inverse U-shaped passage, the water level in the passage rises to suck water into the inverse U-shaped passage, so that a communication is established between two water tanks through the inverse U-shaped passage. When he mid portion of the inverse U-shaped passage is below the normal water level in the water passage, water is allowed to fill the inverse U-shaped passage even in normal state, thus maintaining communication between two water tanks. Conversely, when a positive pressure is applied to the mid portion of the passage, the communication is interrupted. The manners of operation of the communication control device in other forms are materially the same as those described above.

When pressurizing/sucking means is used for the purpose of the pressure control, the communication between two water tanks is interrupted when positive pressure is applied to the control chamber or the inverse U-shaped passage, and the communication is established when negative pressure is applied to the same. This form is advantageously adopted when the distance between the normal water level in the water tank and the top wall of the water tank is small.

BRIEF DESCRIPTION OF THE DRAWINGS

FIG. 7 is a sectional view of a further embodiment of the present invention;

FIG. 8 is a sectional view taken along the line VIII—VIII of FIG. 7;

FIG. 9 is a sectional view of a still further embodiment of the present invention;

FIG. 10 is a sectional view taken along the line X—X of FIG. 9;

THE BEST MODE FOR CARRYING OUT THE PRESENT INVENTION

Embodiments of the communication control device of the present invention will be described hereinunder.

Figure 1:
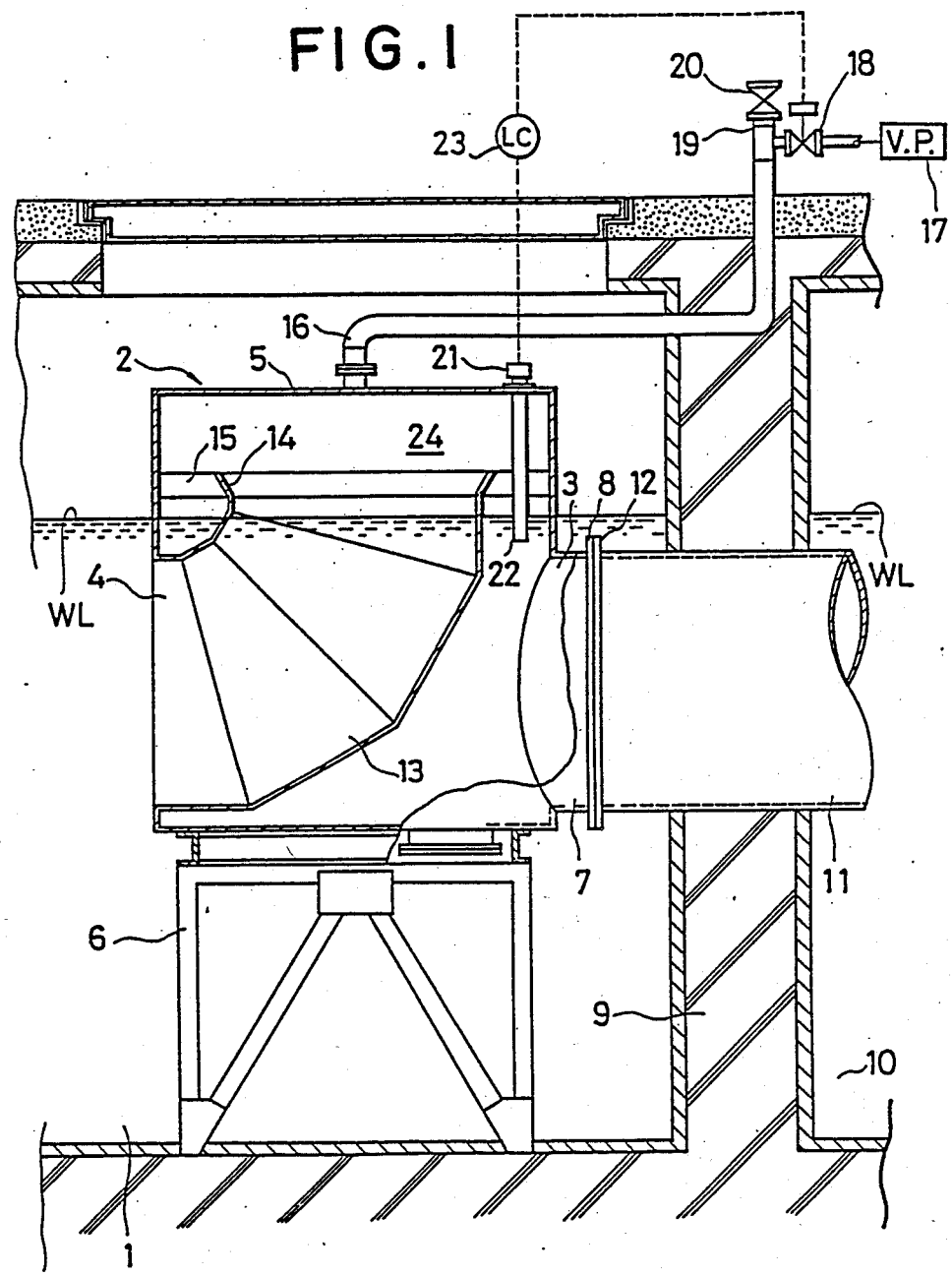
FIG. 1 is a sectional view of an embodiment of the device in accordance with the invention for providing communication between water tanks.

FIG. 1 shows a communication control device 2 which is provided between a pair of adjacent water tanks 1, 10 constituting a heat accumulation water tank system. The communication device 2 is constituted by a box-shaped housing 5 which is provided therein with a control chamber 24 and with an inlet 3 and an outlet 4 at the left and the right sides thereof. The housing 5 is placed on a support fixed on the bottom of the water tank 1. The housing 5 has a pipe 7 which is formed integrally therewith and extending therefrom so as to communicate with the inlet 3. A connection flange 8 is formed on the end of the pipe 7. A connection flange 12 of a communication pipe 11 is connected to the flange 8. The water tanks 1, 10 are separated from each other by a partition wall 9, and the aforementioned communication pipe 11 is supported by the partition wall 9. The communication pipe has one end opened to the interior of the water tank 10, thus constituting a passage through which the interior of the water tank 10 is connected to the control chamber 24. A riser pipe 13 is provided in the housing 5 so as to rise upward from the outlet 4. The pipe 13 has an end which opens in the control chamber 24 at a level which is higher than the upper brims of the inlet 3 and the outlet 4 and which is higher than the water level WL obtained in the water tanks 1, 10 in the normal state of use. The end 14 of the pipe 13 is supported on the housing 5 by means of a plurality of radial supports 15 so as to prevent the riser pipe 13 from oscillating by the force of the fluid.

A gas passage 16 is attached to the upper wall of the housing 5. The gas passage 16 is communicated with a vacuum pump 17. A solenoid valve 18 is interposed between the vacuum pump 17 and the gas passage 16 A gas passage 19 shunts from a portion between the housing 5 and the solenoid valve 18. This gas passage opens to the atmosphere through a stop valve 20. A liquid level meter 21 for detecting the liquid level in the control chamber 24 is secured to the upper wall of the housing 5. This liquid level meter 21 is an electrostatic capacitive level meter having an electrode 22 inserted into the control chamber 24 at the exterior of the riser pipe 13. The output terminal of the liquid level meter 21 is connected to the input terminal of the liquid level controller 23 the output of which is connected to a solenoid valve 18. The operation of this communication control device will be explained herein under with reference to FIG. 2. In order to establish the communicating state of the communication device, the valve 20 is closed and the solenoid valve 18 is opened and closed in accordance with the level in the control chamber 24. When the solenoid valve 18 is opened, negative pressure is introduced into the control chamber 24 from the vacuum pump 17 through the gas passage 16. In consequence, the water level H in the housing 5 is raised to a level above the level of the end 14 of the riser pipe 13, whereby two adjacent water tanks 1, 10 are brought into communication with each other. The state of the solenoid valve 18 is controlled in response to the result of detection of the water level H in the control chamber 24 so as to maintain the communication.

Conversely, in order to interrupt the communication between the water tanks 1, 10, the valve 20 in the gas communication pipe 19 is opened and the solenoid valve 18 is closed. As a result, atmospheric pressure is introduced into the control chamber through the gas passage 16, whereby the water level in the control chamber 24 is lowered to the same level WL as the water tanks 1, 10, thus interrupting the communication between the water tanks 1, 10.

The liquid level meter 21 and the liquid level controller 23 in this communication control device operate to maintain the liquid level in the control chamber 24 above the level of the end 14 of the riser pipe 13. To this end, the electrode 22 of the liquid level meter 21 is so designed as to be able to detect two reference levels which are set beforehand, and the solenoid valve 18 conducts a control such that the actual liquid level is always maintained between two reference levels even in the case of the fall of the liquid level due to leakage from the gas passage.

Figure 2:
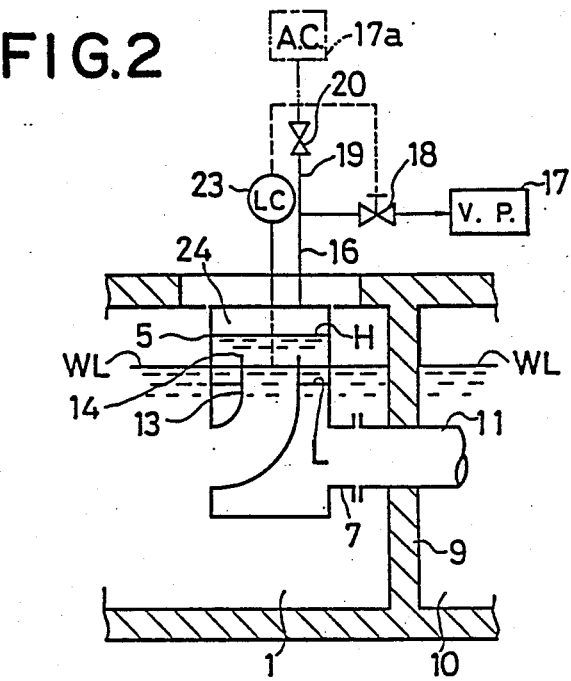
FIG. 2 is a schematic illustration of operation of the device shown in FIG. 1.

In this embodiment, if it is not allowed to preserve a sufficiently large distance between the normal water level L and the top walls of the water tanks 1, 10, the end 14 of the riser pipe 13 cannot project by a sufficient height from the water level in the water tanks 1, 10, so that the device may fail to maintain the shut-off state. In such a case, the end 14 of the riser pipe 13 may be positioned substantially at the same level as the normal liquid level WL in the water tanks 1, 10, and the valve 20 is constituted by a solenoid valve, and a compressor 17a is connected to the solenoid valve 20 as shown in FIG. 2. For the purpose of interrupting the communication between two water tanks 1, 10, the solenoid valve 18 is closed and the solenoid valve 20 is actuated to allow the compressed air to be introduced into the control chamber 24. As a result of this control, the water level in the control chamber 24 is lowered to a level L which is lower than the water level WL in the water tanks 1, 10, so that the end 14 of the riser pipe 13 is maintained sufficiently above the water level L in the control chamber 24, thereby to ensure the shut-off of the communication between two water tanks. For the purpose of recovering the communication between two water tanks 1, 10, the solenoid valve 20 is closed and the solenoid valve 18 is operated. As a result of this control, the water level H in the control chamber 24 rises to a level which is sufficiently higher than the end 14 of the riser pipe 13, whereby the communication is established. The control of the liquid levels H, L in the control chamber 24 can be effected by the liquid level controller 23 which is suitably switched between the communicating condition and the shut-off condition. FIGS. 3 to 6 show different embodiments of the present invention.

Figure 3:
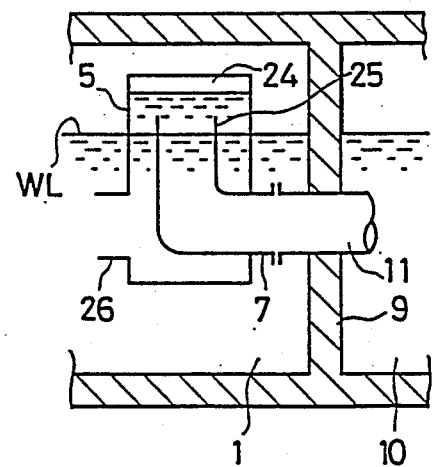
FIGS. 3 to 6 are views similar to FIG. 2 but showing different embodiments of the invention.

The communication control device 3 as shown in FIG. 3 has a housing 5 installed in the water tank 1 and a pipe 7 connected to the water tank 10 rises in the control chamber 24 thus constituting a riser pipe 25. As is the case of the riser pipe 13 in FIG. 2, the riser pipe 25 extends upward to a level which is above the normal water level WL in the water tanks 1, 10. A pipe 26 opening into the water tank 1 is secured to the side wall of the housing 5 at a level below the upper end of the riser pipe 25.

Figure 4:
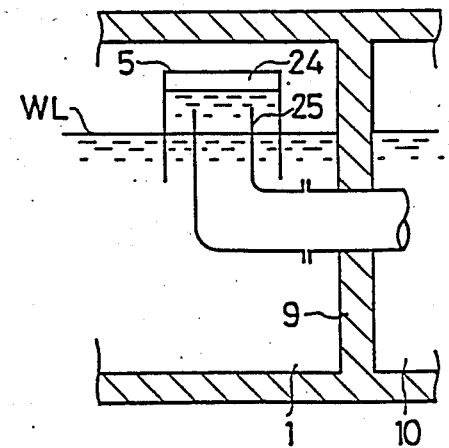

The communication control device shown in FIG. 4 has a riser pipe 25 similar to that in FIG. 3. In this device, however, the housing 5 is constructed in the form of a hood which is opened at its lower side In this embodiment also, the upper end of the riser pipe 25 opens into the control chamber 24 at a level above the water level in the water tanks 1, 10.

Figure 5:
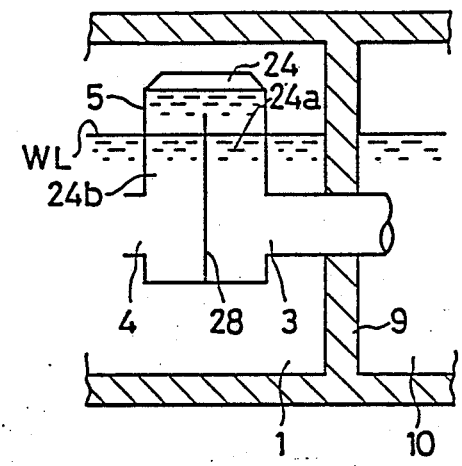

The communication control device shown in FIG. 5 employs a partition wall 28 in place of the riser pipe 25 shown in FIG. 3. The upper end of the partition wall 28 is positioned above the levels of the upper edges of the inlet 3 and the outlet 4 of the housing 5 and also above the normal water level WL in the water tanks 1, 10. The partition wall 28 divides the control chamber 24 in the housing 5 into two chambers namely, chambers 24a and 24b. These chambers 24a and 24b communicate with each other at their upper portions The communication chamber 24a is connected to the water tank 10 through the inlet 3, while the chamber 24b communicates with the water tank 1 through the outlet 4.

In each of the embodiments shown in FIGS. 3 to 5, the space in the upper portion of the control chamber 24 is connected to a vacuum pump (not shown) through a valve, as in the case of the embodiments shown in FIGS. 1 and 2. The control of the communication and shut-off of the water tanks 1, 10, therefore, is conducted in the same manner as that in the embodiments shown in FIGS. 1 and 2. In each of the embodiments shown in FIGS. 1 to 5, if the water tanks 1, 10 store water of different temperatures, the water of different temperatures is introduced into the riser pipe and the control chamber, so that it is necessary that a suitable heat-insulating member is provided on the walls of the housing, and the passage between the water tanks 1, 10.

The embodiments shown in FIGS. 3 to 5 may be modified such that the control of the pressure in the control chamber 24 is conducted by the combination of a compressor and a vacuum pump as described before. Obviously, the communication between the water tanks 1, 10 is interrupted when compressed air is introduced into the control chamber 24 from the compressor, whereas the communication is established when vacuum is introduced into the control chamber.

In the embodiment shown in FIG. 5, the communication control device is constituted by an inverse U-shaped pipe 29 which is provided in such a manner as to bridge over the partition wall 9 which separates both water tanks 1, 10. Both end portions of the inverse U-shaped pipe 29 are curved downward within the water tanks 1, 10 so as to open to the bottom in the water tanks 1, 10. The inverse U-shaped pipe 29 is installed such that its mid portion 30 is positioned at the highest level. Thus, the intermediate passage 31 constituted by this intermediate portion 30 is positioned above both end portions.

Figure 6:
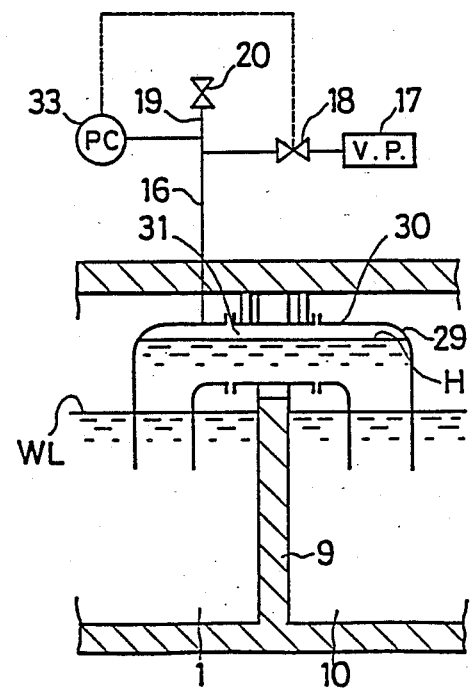

The inverse U-shaped pipe 29 is positioned below the level WL in the water tanks 1, 10, while the intermediate passage 31 is positioned above the water level WL. The gas passage 16 is connected to this intermediate passage 31. Usually, the solenoid valve 18 is kept open while the valve 20 in the gas passage is closed, so that the water level has risen to the level H shown in FIG. 6 so as to enable the water to fill the intermediate passage 31, thereby providing communication between the water tanks 1, 10. As the valve 20 is opened while the solenoid valve 18, the intermediate passage 31 is filled with air, so that the communication between adjacent water tanks 1, 10 is interrupted. A pressure controller 33 is connected to the gas passage 16. A solenoid valve 18 is connected to the pressure controller 33. The pressure controller 33 incorporates a vacuum gauge the output of which is used in controlling the solenoid valve 18 such that the vacuum is introduced into the gas passage 16 from the vacuum pump 17 thereby to maintain vacuum of a predetermined level in the gas passage 16. In this communication control device, when it is designed to allow the water to fill the gas passage 16, the state of communication is preferably detected by means of a pressure gauge as in this embodiment, rather than by a level meter. In this embodiment, the communication control device is constituted by an inverse U-shaped pipe and the intermediate passage provided by the inverse U-shaped pipe is located above the normal liquid level in the water tank. This advantageously eliminates the necessity for any water-tight seal between the inverse U-shaped pipe and the partition wall. When the communication control device is constituted by an inverse U-shaped passage such as an inverse U-shaped pipe, the space in the inverse U-shaped passage is filled with air when the communication is to be shut-off, so that the disconnection between two adjacent water tanks is safely maintained by the air, with the result that the loss of heat is minimized even when the water temperatures in both tanks are different. This advantageously eliminates the necessity for the provision of heat-insulating material on the inverse U-shaped pipe and other members. In the embodiment of FIG. 6 also, the arrangement may be such that the intermediate passage 31 constituted by the intermediate portion 30 of the inverse U-shaped pipe 29 is positioned substantially at the same level as the normal water level WL in the water tanks 1, 10, with the help of means for pressurizing and evacuating the intermediate passage 31 for the purpose of interruption and establishment of the communication.

FIGS. 7 and 8 show an embodiment in which the inverse U-shaped passage equivalent to that of FIG. 6 is constituted by the top walls of the water tanks. Referring to FIG. 7, two water tanks 1, 10 are separated from each other by a partition wall 9, and the upper end of the partition wall 9 is so sized that a predetermined gap is left between its upper end and the top wall 9a of the water tanks. The top wall 9a has a passage forming wall 50 adjacent to the water tank 1 and a passage forming wall 51 adjacent to the water tank 10. These passage forming walls are disposed on both sides of the partition wall 9 so as to extend downward The passage forming walls 50, 51 cooperate with the partition wall 9 in forming an inverse U-shaped passage 52 which has an intermediate portion above the normal water level WL in the water tanks 1, 10, while both ends thereof open downward in the respective water tanks 1, 10 at levels below the normal water level WL in the water tanks 1, 10. The top wall 9a of the water tank has a gas passage connecting pipe 53 which opens to the passage 52. A gas passage 16 similar to that in each of the described embodiment is connected to the gas passage connecting pipe 53. When the upper end of the partition wall 9 is above the normal water level WL in the water tanks 1, 10 as in the illustrated embodiment, the gas passage 16 is connected to the vacuum pump through the solenoid valve. When this solenoid valve is opened, vacuum is introduced into this passage 52 so that water rises in the passage 52 so as to bring both water tanks 1, 10 into communication with each other. When the arrangement is such that the upper end of the partition wall 9 is below the normal water level WL in the water tanks 1, 10, i.e., when so-called underwater-dam type structure is employed, the gas passage 16 is connected to a compressor through a solenid valve so as to be supplied with compressed air through the solenoid valve thereby to interrupt the communication between both water tanks 1, 10. The electrode 22 of the liquid level meter 21 is inserted into the passage 52 through the gas passage connecting pipe 53 so that the water level in the passage 52 is detected by the liquid level meter 21.

FIGS. 9 and 10 illustrate a case in which the inverse U-shaped passage is detachably secured to the top wall of the water tanks. In this embodiment, the top wall 9a disposed above the partition wall 9 has an opening 9b and a cover 60 is provided in such a manner as to close the opening 9b. A passage forming member 61 having an inverse U-shaped passage 62 is provided on the underside of the cover 60. The passage forming member 61 is so disposed that it bridges over the partition wall 9 when the cover 60 closes the opening 9b. When the passage forming member is installed at this position, the inverse U-shaped passage 62 is positioned above the water level in the water tanks 1, 10, with both ends thereof opened downward in the respective water tanks 1, 10 at a level below the water level. As in the case of the embodiment shown in FIGS. 7 and 8, this embodiment also has a gas passage connecting pipe 63 connected to the inverse U-shaped passage 62. In this embodiment, the connection pipe 63 is formed as a unit with the passage forming member 61 A gas passage 16 is connected to the connecting pipe 63. An electrode 22 of the liquid level meter 21 extends through the connecting pipe 63 into the passage 62.

Figure 11:
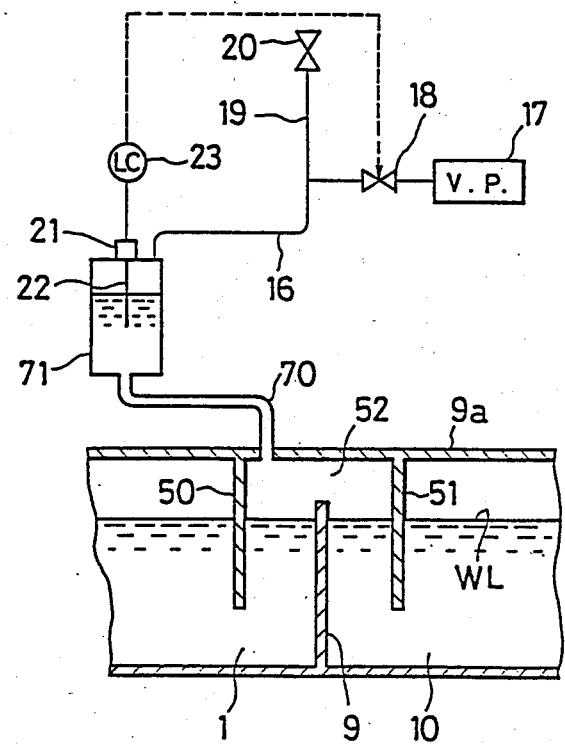
FIG. 11 is a schematic sectional view of a modification of the embodiment as shown in FIG. 7.

FIG. 11 illustrates a modification of the embodiment shown in FIG. 11. As will be seen from this Figure, a connection passage 70 is secured to the upper wall 9a of the water tank so as to open into the inverse U-shaped passage 52. A water reservoir 71 of a small diameter is connected to the connection passage 70. The upper portion of the reservoir 71 is connected to the gas passage 16 similar to those in the described embodiments. The electrode 22 of the liquid level meter 21 is inserted into the water reservoir 71. The operation of the liquid level meter 21 is the same as that in the described embodiments. In operation, for the purpose of bringing both water tanks 1,10 into communication with each other, the water is made to rise to the level of the water reservoir 71. Since the water reservoir 71 has a comparatively small diameter, any fluctuation in the liquid level can be detected even by a sensor having a comparatively low sensitivity. When two adjacent water tanks 1, 10 are brought into communication with each other as in this embodiment, it is possible to arrange such that the water fills the passage up to the top wall of the communication passage. In this case, the cross-sectional area of the communication passage is always maintained constant and, therefore, the flow resistance also is maintained constant, whereby a stable flow of water is maintained and fluctuation in water levels in the associated water tanks can be suppressed. By arranging such that the water surface in the water reservoir can be visually checked from the exterior, the states of communication, i.e., whether the communication is interrupted or established can conveniently be confirmed visually.

Figure 12:
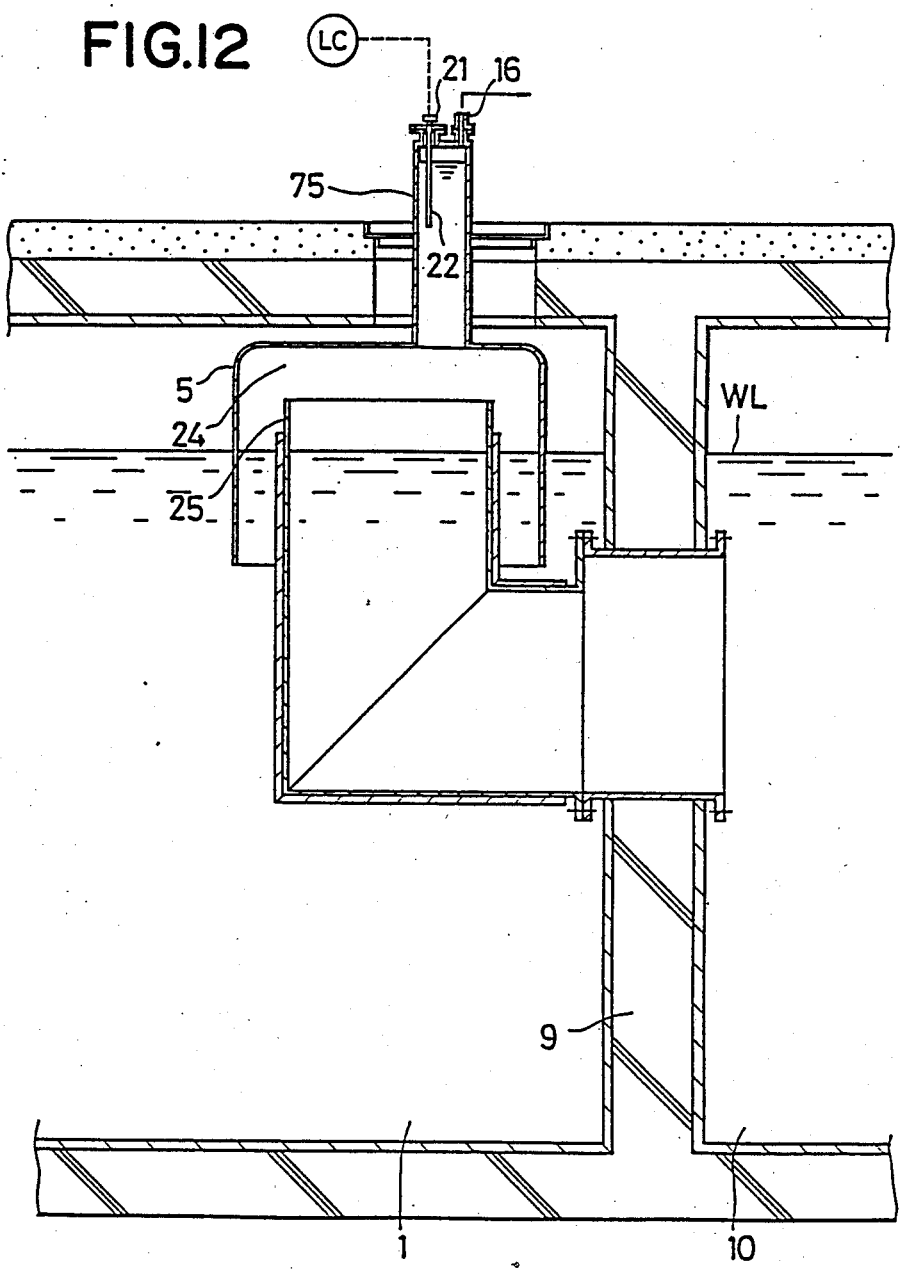
FIG. 12 is a sectional view of a modification of the embodiment shown in FIG. 4.

FIG. 12 shows an embodiment in which the principle of the arrangement shown in FIG. 11 is applied to the arrangement shown in FIG. 4. Thus, the same reference numerals are used in this Figure to denote the same parts or members as those appearing in FIG. 4, and the detailed description thereof is omitted. In this embodiment, the housing 5 is provided with a pump-up pipe 75 which extends upward and the gas passage pipe 16 is connected to this water pump-up pipe 75. In addition, the electrode 22 of the liquid level meter 21 is inserted into the water pump-up pipe 75. For the purpose of establishing communication between the water tanks 1 and 10, the water is pumped up to fill the water pump-up pipe 75. This arrangement offers the same advantages as those offered by the embodiment shown in FIG. 11. The embodiments shown in FIGS. 7 to 12 also conduct the interruption of the communication by applying pressure, while the establishment of communication is effected by the introduction of vacuum. The embodiments shown in FIGS. 7 to 12, which has an opening for mounting the liquid level meter 21 on the floor immediately above the heat accumulation tank system offers an advantage that the maintenance of the liquid level meter can be facilitated.

In the embodiments described hereinbefore, the connection between two adjacent water tanks are provided above the normal water level in the water tanks. The communication between both tanks is usually interrupted and the liquid level is raised in response to introduction of vacuum to fill up the connection, thereby establishing the communication between two tanks. This arrangement, however, is not exclusive.

Figure 13:
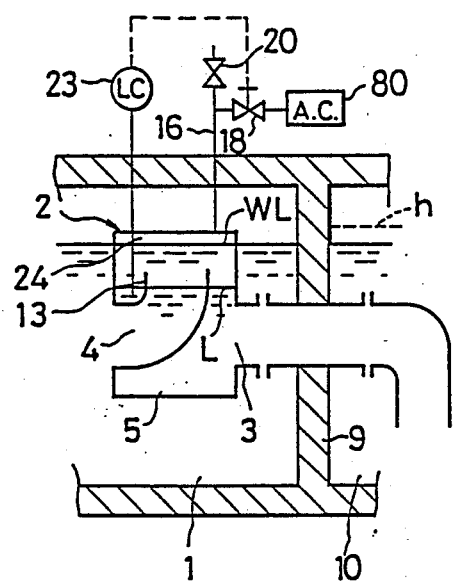
FIGS. 13 to 17 are schematic sectional views of different embodiments corresponding to FIGS. 2 to 6.
Figure 14:
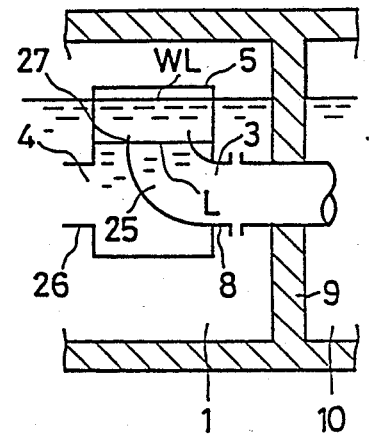
Figure 15:
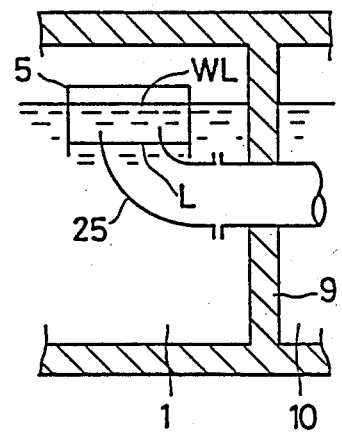
Figure 16:
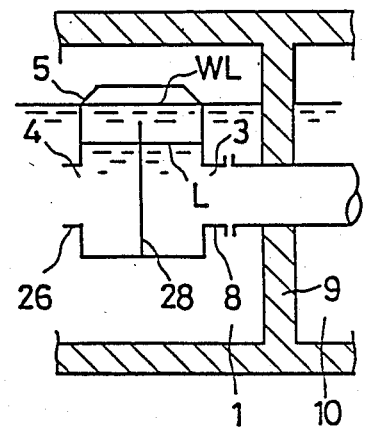

A description will be made herein under as to embodiments in which the connection between two adjacent water tanks is positioned below the normal water level in both water tanks FIGS. 13 to 16 correspond to FIGS. 2 to 5. The riser pipe 13 in the embodiment shown in FIG. 13, the pipe 25 in the embodiments shown in FIGS. 14 and 15, and the upper end of the partition wall 28 in the embodiment of FIG. 16, respectively, are positioned at a level below the normal water level H in both water tanks 1, 10. Thus, both water tanks 1, 10 are communicated with each other in normal state. As schematically shown in FIG. 13, a gas passage 16 connected to the control chamber 24 is connected also to a compressor 80 through a solenoid valve 18. When the solenoid valve 18 is opened, compressed air from the compressor 80 is introduced into the control chamber 24, so that the liquid level in the control chamber is lowered to a level below the upper end of the riser pipe 13, as indicated at L, whereby the communication between both water tanks 1, 10 is interrupted. Although not shown in FIGS. 14 to 16, the embodiments shown in these Figures have similar constructions.

Figure 17:
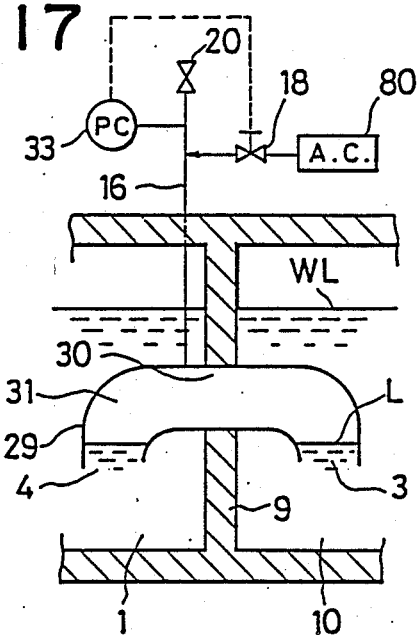

FIG. 17 illustrates an embodiment which corresponds to FIG. 6. The difference between the embodiment shown in FIG. 6 and that shown in FIG. 17 resides in that the inverse U-shaped pipe 29 is positioned below the normal water level WL in the water tanks 1,10. In this embodiment, the gas passage 16 is connected to the compressor 80 through the solenoid valve 18.

Figure 18:
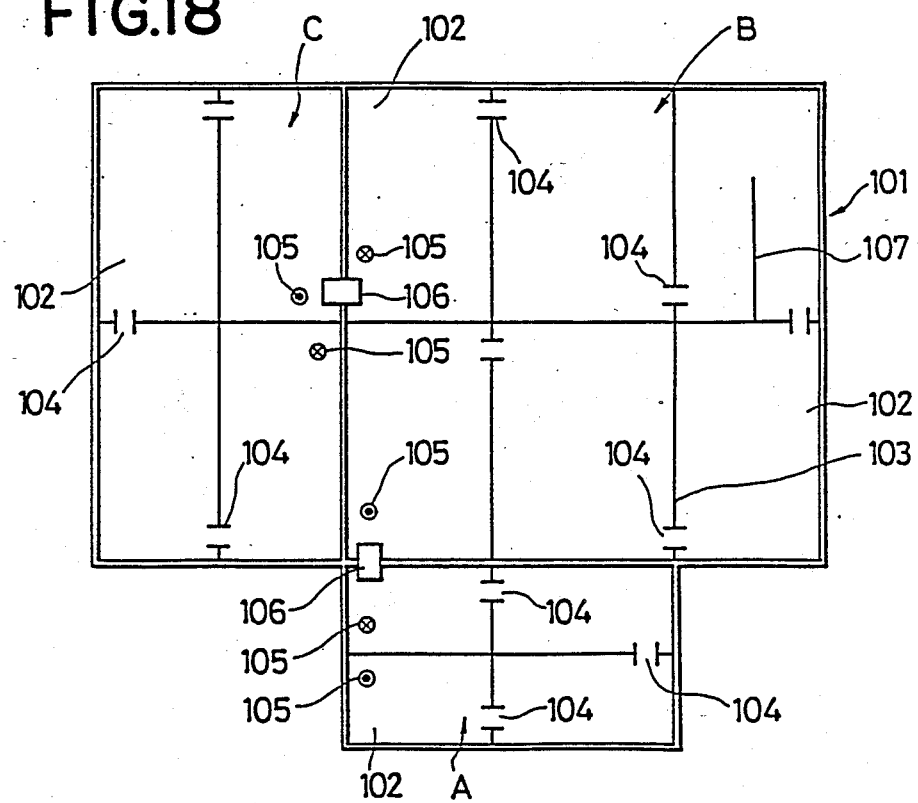
FIG. 18 is a plan view of an embodiment of the heat accumulation tank system to which the present invention is applied.

FIG. 18 is a plan view of an example of the heat accumulation tank system to which the present invention is applied. The heat accumulation tank system 101 is sectioned into a plurality of water tanks 102 by means of partition walls such as anti-earthquake concrete walls. These water tanks 102 are grouped suitably to form blocks A, B and C of the water tanks. In each block, the adjacent water tanks 102 are mutually connected through a communication pipe 104. A pipe 105 for pumping water up from the water tank and for returning the water into the same is provided in each block. A communication control device 106 in accordance with the present invention is provided between adjacent blocks of the water tanks. Some water tanks 102 are provided therein with flow settling plates 107 which are intended for preventing short-circuiting of flow of the water.

Figure 19:
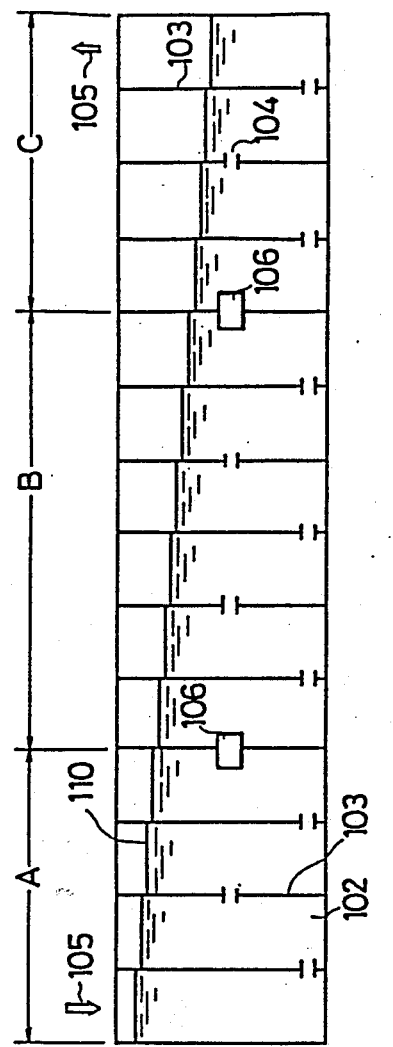
FIGS. 19 to 24 are schematic illustrations of the states of use of the heat accumulation tank system in different seasons.

FIGS. 19 to 23 illustrates the state of seasonal operation of the heat accumulation tank system. All the water tanks 102 of the blocks A, B and C are illustrated as being developed laterally. FIG. 19 illustrates the state of operation in mid summer. In this case, all the water tanks 102 of all the blocks A, B and C take part in the cooling. Thus, the communication control device 106 between adjacent blocks operate to establish and maintain communication between these blocks.

Water is returned to one of the water tanks 102 in the block A and is made to pass through the successive water tanks in the block A to come into the water tank 5 in the block B. The water then flows through the successive water tanks in the block B and then through the successive water tanks 102 in the block C. The water is then pumped up from the final water tank 102 in the block C. Levels of the water in the successive water tanks 102 vary in amount corresponding to the flow resistance encountered with the water flowing through adjacent water tanks 102.

Figure 20:
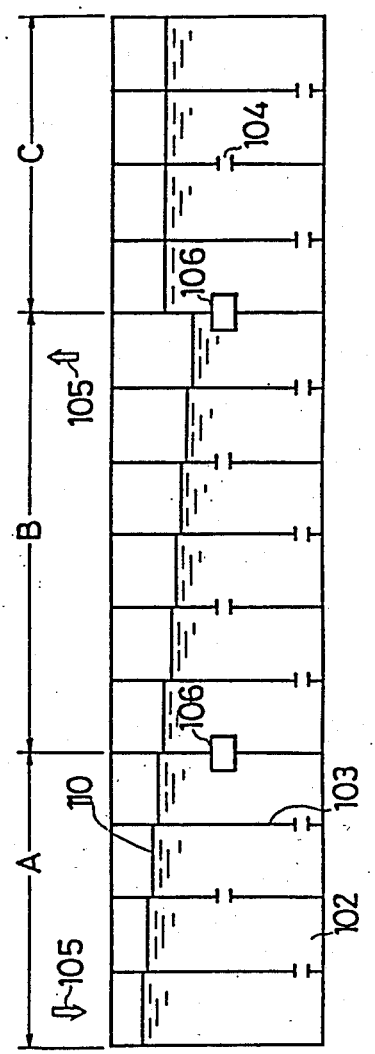
Figure 21:
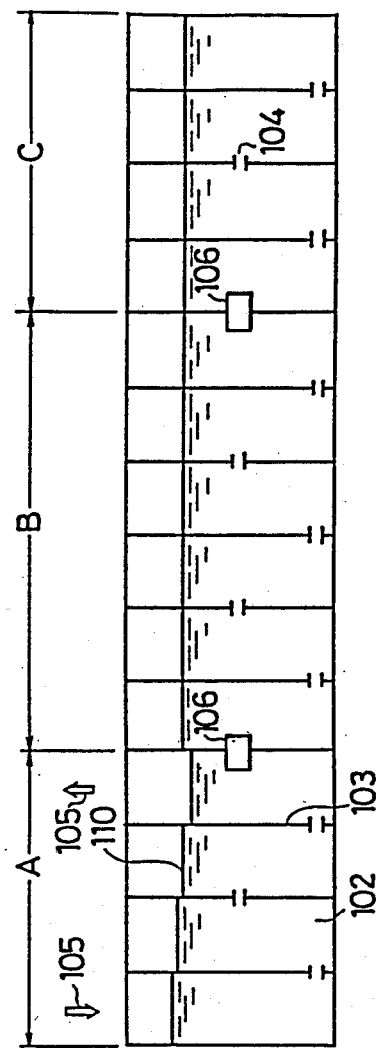
Figure 22:
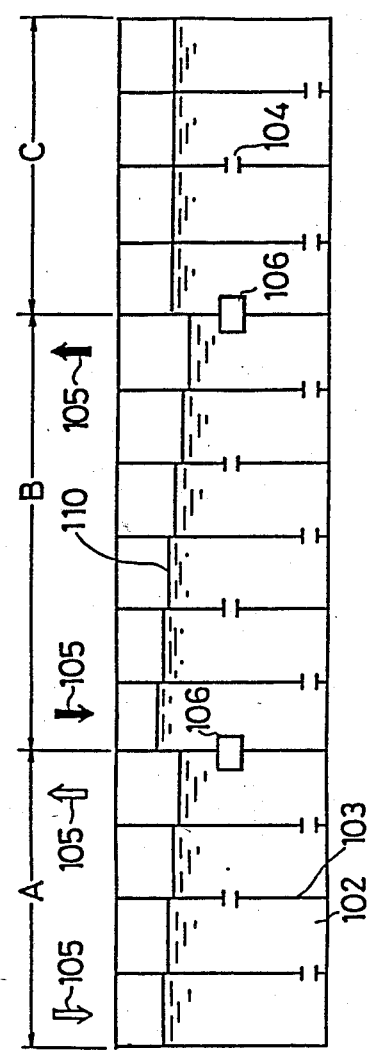

FIG. 20 illustrates the state of operation in, for example, May or Septemper. In this case, chilled water is stored in the water tanks 102 of the block A and the block B for the purpose of cooling air. In this case, therefore, the communication control device 106 between the blocks A and B operates to establish and maintain communication therebetween, while the communication control device 106 between the blocks B and C operates to interrupt the communication therebetween. FIGS. 21 and 22 show the state of operation in, for example, April and November or March and November. In the state shown in FIG. 21, the communication control devices 106 between the blocks A and B and between the blocks B and C interrupt the communication between these blocks, so that only the water tanks 102 in the block A takes part in the cooling. In FIG. 22, the communication control devices 106 between the blocks A and B and between the blocks B and C operate to interrupt the communications, and the water tanks 102 of the block A is used for cooling air, while the water tanks in the block A is used for the purpose of heating air.

Figure 23:
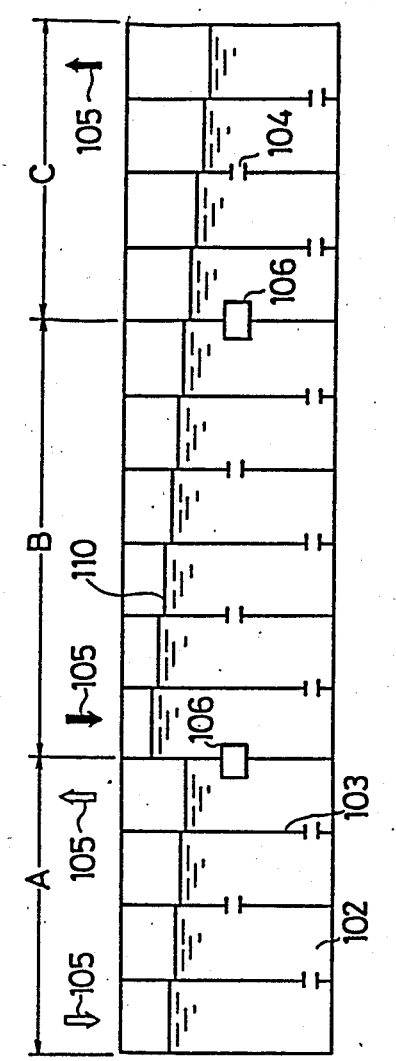
Figure 24:
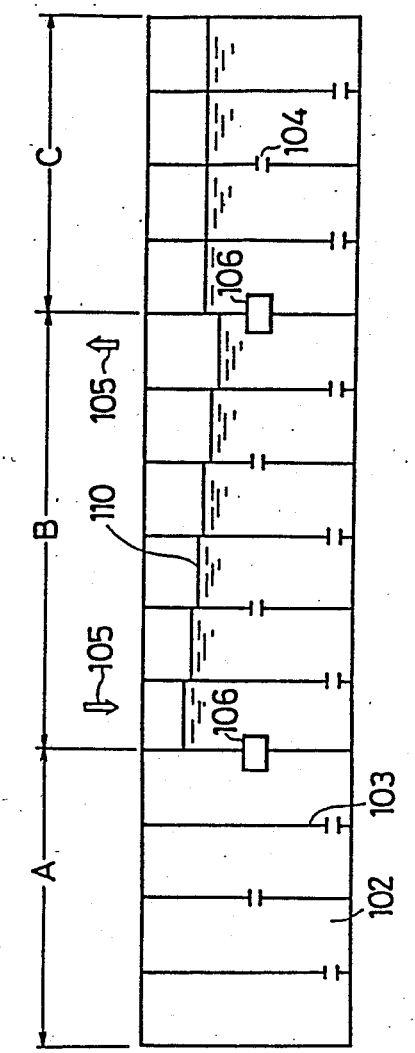

FIG. 23 illustrates the state of operation in winter season. The communication control device 106 between the blocks A and B is held in interrupting state, while the communication control device 106 between the blocks B and C allows the blocks B and C to communicate with each other, so that the water tanks 102 in the block 102 are used for cooling purpose, while the water tanks 102 in the blocks B and C are used for heating purpose. In the states shown in FIGS. 20 to 22, the tanks 102 of the block which are not being used may be drained for the purpose of inspection of the tank interior. The draining of the water tanks 102 of the block A can be conducted by operating the communication control devices 106 to shut-off the communication and, instead of the state of use as shown in FIG. 21, chilled water is stored in the water tanks of the block 102. FIG. 24 shows the state of the system in which the water tanks 102 in the block A have been drained.

When the communication control device of the present invention is used between a water tank which is drained and a water tank which is not drained as in the case of the water tank of the block A and the water tank of the block B in the operating state shown in FIG. 24, it is advantageous to use the communication control device of the type which normally interrupts the communication and recovers the communication under action of a vacuum, as in the embodiments shown in FIGS. 1 to 12.

To explain in more detail in this connection, assuming the embodiment shown in FIG. 13 is used as the communication control device 106 in the system shown in FIG. 24, the control chamber 24 is brought into communication with the air in the water tank 1 when the water level in the water tank 1 of the block A has come down below the level of the upper edge of the opening 4, thus disabling the control of the pressure in the control chamber 24. In this state, it is impossible to interrupt the flow of water in the control chamber 24, so that the water in the water tank 10 of the block B is discharged into the tank 1 through the pipe 13. This flow is continued until the water level in the water tank 10 is reduced to the level of the upper end of the riser pipe 13. Consequently, the water level in the water tanks in the block B is lowered when the water tanks of the block A are drained. This means that the water in the water tanks of the block B is wasted and that the volume of water which can be used in the water tanks of the block B is reduced to decrease the capacity of heat accumulation Thus, this arrangement is quite uneconomical Usually, the heat accumulation tank system is provided with suitable means for maintaining water level in the water tanks in order to ensure sufficient heat accumulation capacity and stable operation. If the operation of the system has to be continued with the water level in the tanks of the block B, therefore, it is necessary to provide separate water level control means which maintains the lower water level, thus requiring a complicated control of the heat accumulation tank system.

In contrast, in the embodiment shown in FIG. 2, the upper end of the riser pipe 13 is positioned above the normal water level in the water tanks 1, 10, so that the reduction of water level in a tank or tanks of any block does not affect the water levels in the tanks of other blocks in the shut-off condition realized by establishment of the atmospheric pressure in the control chamber 24. This also is true with other embodiments shown in FIGS. 3 to 12, so that the above-described disadvantages from the view points of economy and controller are all eliminated.

In the state of use of the system as shown in FIG. 23, a considerably large difference of water level is developed between the downstream end water tank 102 of the block A and the upstream end water tank 102 of the block B, in the state in which the communication is interrupted. It is to be understood that the use of the communication control device of the type shown in FIGS. 1 to 12, which normally shuts off the communication and recover the communication under action of vacuum, is a specifically advantageous in the case where a large difference of the water level is developed between the adjacent water tanks which are connected through the communication control device.

This fact will be explained in more detail through an embodiment. It is assumed here that the communication control device of the type shown in FIG. 13 is used which normally provides communication and interrupts the communication under the action of positive pressure. In such a case, it is preferred that air is suitably blown into the control chamber so as to maintain a constant water level in the control chamber, in order to make up for the leakage of the gas during interruption of communication. In such a case, a certain problem is encountered in regard to the level of the water in the control chamber. In the embodiment shown in FIG. 13, if a difference of water level is caused between the water tanks 1 and 10 such that the water level in the water tank 10 is higher than that in the water tank 1 by a height h while both tanks 1 and 10 are disconnected from each other, the water level around the riser pipe 13 rises in the control chamber 24, while the water level in the riser pipe 13 comes down, with the result that a level difference h is established between the interior and the exterior of the riser pipe.

In the embodiment shown in FIG. 13, the pressure in the control chamber 24 is controlled upon detection of the water feel outside the riser pipe 13 in the control chamber 24, so that the above-mentioned rise in the water level around the riser pipe 13 is sensed by the liquid level meter, whereby the pressure in the control chamber 24 rises by amount corresponding to the rise in the water level. As a result, the water level in the control chamber 24 is further reduced so that air is blown into the water tank 1. In order to avoid such a direct blowing of air into the water tank, it is necessary to conduct a highly complicated control. This is quite inconvenient from the view point of economy.

In contrast, in the embodiment shown in FIG. 2, the control chamber is held in communication with the atmosphere when the communication device interrupts the communication, so that it is not necessary to control the pressure in the control chamber. Thus, the above-mentioned problem can easily be overcome simply by setting the upper end of the riser pipe 13 at a level which is determined by taking into consideration the possible rise of the water level in the water tank 10. In the embodiment of the type in which the communication is established by the application of a negative pressure, an easy detection of the water level is realized by providing a water reservoir or the water pump-up pipe as in the embodiments shown in FIGS. 11 and 12.

Thus, in some uses of the communication control apparatus of the invention, the device of the type which establish communication by application of vacuum produces a greater effect than the device of the type which interrupts the communication by application of pressure.

INDUSTRIAL APPLICABILITY

The communication control device of the present invention does not need any movable part to be disposed in the liquid part so that it is almost free from the problems such as operation failure and breakdown or wear of the parts. In consequence, the work for the protective maintenance can be reduced remarkably. Furthermore, it becomes possible to realize a remote control by suitably elongating the gas passage. In addition, it becomes possible to make an efficient use of a restricted area in the building or the like, because it is not necessary to preserve a large space on the floor immediately above the heat accumulation chamber for the purpose of installing the valve operating mechanism or a large area for the protective maintenance.

What is claimed is:

1. In a heat accumulation tank system having a plurality of water tanks which are separated by partition walls, a communication control device for controlling the state of communication between adjacent two water tanks of said system, comprising: a control chamber connected to one of said two adjacent water tanks and closed at least upper side thereof; a passage having one end opening in the other of said two adjacent water tanks and the other end which rises through said control chamber so as to open in said control chamber at a level above the normal water level in said water tanks; a vacuum section means connected to an upper portion of said control chamber through a valve means; a through pipe provided on the upper side of said control chamber and having one end opening in said control chamber while the other end is closed at a level higher than the top wall of said heat accumulation tank system; and a liquid level sensor provided in said control chamber through said through pipe.

2. A communication control device according to claim 1, further comprising a gas passage connected to said through pipe and leading to a pressure control means.

3. In a heat accumulating tank system having a plurality of water tanks separated by partition walls, a communication control device for controlling the state of communication between two adjacent water tanks of said system, comprising: an inverse U-shaped passage having one end opening in one of said two water tanks and the other end opening in the other of said two water tanks; pressure controlling means for controlling the pressure in the upper portion of said inverse U-shaped passage; a through pipe provided on the upper side of said inverse U-shaped passage and having one end opening in said inverse U-shaped passage while the other end is closed at a level higher than the top wall of said heat accumulation tank system; and a liquid level sensor provided in said inverse U-shaped passage through said through pipe.

4. A communication control device according to claim 3, wherein said passage is disposed such that the intermediate portion thereof is disposed above the normal water level in said water tanks while both ends thereof are disposed below said water level, and said pressure control means is constituted by vacuum suction means connected to an upper portion of said inverse U-shaped passage through a valve means.

5. A communication control device according to claim 3, wherein said passage is disposed such that its whole portion is disposed below the normal water level in said water tanks, and wherein said pressure control means includes a compressor connected to an up portion of said inverse U-shaped passage through valve means.

6. A communication control device according to claim 3, further comprising a gas passage connected to said through pipe and leading to a pressure control means.

7. In a heat accumulating tank system having a plurality of water tanks separated by partition walls, a communication control device for controlling the state of communication between two adjacent water tanks of said system, comprising: a control tank defining in one of said two adjacent water tanks a closed control chamber; a riser pipe having one end opened to the outside of said control tank at a level below the normal water level in one of said two adjacent water tanks and the other end rising through said control tank so as to open at its upper end in an upper portion of said control chamber; a passage through which said control chamber is connected to the other of said two adjacent water tanks; and pressure control means for controlling the pressure in an upper portion of said control chamber.

8. A communication control device according to claim 7, further comprising a through pipe disposed above said control chamber and having one end opened in said control chamber while the other end is closed at a level above the top wall of said heat accumulation tank system, and a liquid level sensor provided in said control chamber through said through pipe.

9. A communication control device according to claim 8, further comprising a gas passage connected to said through pipe and leading to said pressure control means.

10. A communication control device according to claim 7, further comprising a water reservoir connected to said control chamber, a gas passage connected to an upper portion of said water reservoir and leading to a vacuum suction means, and a liquid level sensor provided in said water reservoir.

11. In a heat accumulating tank system having a plurality of water tanks separated by partition walls, a communication control device for controlling the state of communication between two adjacent water tanks of said system, comprising: a control tank disposed in one of said two adjacent water tanks and closed at least the upper side thereof and opened an its lower side to said one of said two adjacent water tanks; a passage having one end opened to the other of two adjacent water tanks while the other end rises through said control tank so as to open at its upper end to an upper portion of a control chamber in said control tank; and a pressure control means for controlling the pressure in the upper portion of said control chamber.

12. A communication control device according to claim 11, further comprising a through pipe disposed above said control chamber and having one end opened in said control chamber while the other end is closed at a level above the top wall of said heat accumulation tank system, and a liquid level sensor provided in said control chamber through said through pipe.

13. A communication control device according to claim 12, further comprising a gas passage connected to said through pipe and leading to a pressure control means.

14. A communication control device according to claim 11, further comprising a water reservoir connected to said control chamber, a gas passage connected to an upper portion of said water reservoir and leading to a vacuum suction means, and a liquid level sensor provided in said water reservoir.

15. In a heat accumulating tank system having a plurality of water tanks separated by partition walls, a communication control device for controlling the state of communication between two adjacent water tanks of said system, comprising: a control chamber disposed in one of said two water tanks and closed at its upper side; a partition means for dividing the interior of said control chamber into a first chamber and a second chamber; an opening through which said first chamber is opened to one of said two water tanks; a passage through which said second chamber is connected to the other of said two water tanks; and pressure control means for controlling the pressure in the upper portion of said control chamber.

16. A communication control device according to claim 15, further comprising a through pipe disposed above said control chamber and having one end opening in said control chamber while the other end is closed at a level above the top wall of said heat accumulation tank system, and a liquid level sensor provided in said control chamber through said through pipe.

17. A communication control device according to claim 16, further comprising a gas passage connected to said through pipe and leading to a pressure control means.

18. A communication control device according to claim 15, further comprising a water reservoir connected to said control chamber, a gas passage connected to an upper portion of said water reservoir and leading to a vacuum suction device, and a liquid level sensor provided in said water reservoir.

19. In a heat accumulation tank system having a plurality of water tanks separated by partition walls, a communication control device for controlling the state of communication between two adjacent water tanks in said system, comprising: passage forming means disposed to bridge over said partition wall between said two adjacent water tanks and forming between said two adjacent tanks an inverse U-shaped passage which provides communication between said two adjacent water tanks bridging over said partition wall; pressure controlling means for connecting the upper portion of said inverse U-shaped passage to a vacuum suction means through valve means; a through pipe provided above said inverse U-shaped passage and having one end opened to said inverse U-shaped passage while the other end is closed at a level above the top wall of said heat accumulation tank system; and a liquid level sensor provided in said inverse U-shaped passage through said through pipe.

20. A communication control device according to claim 19, wherein said passage forming means is provided on the top wall of said heat accumulation tank system.

21. A communication control device according to claim 19, wherein said passage forming means is provided on a cover which is detachably secured to the top wall of said heat accumulation tank system.

22. A communication control device according to claim 19, further comprising a gas passage connected to said through pipe and leading to a control means.

23. A communication control device according to any one of claims 19 to 21, further comprising a through pipe disposed above said control chamber and having one end opened in said control chamber while the other end is closed at a level above the top wall of said heat accumulation tank system, and a liquid level sensor provided in said control chamber through said through pipe.

24. A communication control device according to claim 23, further comprising a gas passage connected to said through pipe and leading to a pressure control means.

25. A communication control device according to any one of claims 19 to 21, further comprising a water reservoir connected to said control chamber, a gas passage connected to an upper portion of said water reservoir and leading to a vacuum suction device, and a liquid level sensor provided in said water reservoir.

26. In a heat accumulation tank system having a plurality of water tanks separated by partition walls, a communication control device for controlling the state of communication between two adjacent water tanks in said system, comprising: a control tank closed at least at its upper side thereof and opening at its lower side to one of said two adjacent water tanks; a passage having one end opened to the other of said two adjacent water tanks and the other end rising through said control tank so as to open at its upper end to an upper portion of a control chamber in said control tank; and pressure control means for pressurizing the space in upper portion of said control chamber so as to interrupt the communication between said two adjacent water tanks and for introducing vacuum to said upper portion of said control chamber so as to establish communication between said two adjacent water tanks.

27. A communication control device according to claim 26, wherein said passage opens to an upper portion of said control chamber at a level near the normal water level in said water tanks.

28. A communication control device according to claim 26 or 27, wherein said control tank is disposed in one of said two adjacent water tanks.

29. A communication control device according to claim 26 or 27, wherein said control tank is disposed in the other of said two adjacent water tanks.

30. A communication control device according to claim 26, further comprising a through pipe disposed above said control chamber and having one end opened in said control chamber while the other end is closed at a level above the top wall of said heat accumulation tank system, and a liquid level sensor provided in said through pipe through said through pipe.

31. A communication control device according to claim 30, further comprising a gas passage connected to said through pipe and leading to a pressure control means.

32. A communication control device according to claim 26 further comprising a water reservoir connected to said control chamber, a gas passage connected to an upper portion of said water reservoir and leading to a vacuum suction device, and a liquid level sensor provided in said water reservoir.

33. In a heat accumulation tank system having a plurality of water tanks separated by partition walls, a communication control device for controlling the state of communication between two adjacent water tanks in said system, comprising: an inverse U-shaped passage disposed between said two adjacent water tanks such that one end of said inverse U-shaped passage opens in one of said two adjacent water tanks while the other end opens in the other of said two adjacent water tanks; and pressure control means for applying a pressure to the space in upper portion of said inverse U-shaped passage so as to interrupt the communication between said two adjacent water tanks and for applying a negative pressure to said space in upper portion of said inverse U-shaped passage so as to establish communication between said two adjacent water tanks.

34. A communication control device according to claim 33, further comprising a through pipe disposed above said inverse U-shaped passage and having one end opened in said inverse U-shaped passage while the other end is closed at a level above the top wall of said heat accumulation tank system, and a liquid level sensor provided in said inverse -shaped passage through said through pipe.

35. A communication control device according to claim 34, further comprising a gas passage connected to said through pipe and leading to said pressure control means.

36. A communication control device according to claim 33, further comprising a water reservoir connected to said inverse U-shaped passage, a gas passage connected to an upper portion of said water reservoir, and a liquid level sensor provided in said water reservoir.

37. A method of controlling the operation of a heat accumulation tank system having a plurality of water tanks separated by partition walls, comprising: grouping said water tanks into a plurality of blocks each having at least one said water tank; allowing said water tanks of the same block to communicate each other, providing a communication device between each adjacent blocks; said communication device having a communication passage provided with a portion which can be charged with a gas; and selectively charging and discharging a gas to and from said portions of said communication passages, whereby the passage of water in said heat accumulation tank system and/or the number of blocks communicated is varied in accordance with the level of the thermal load applied to said heat accumulation tank system.

* * * * *